United States Patent
Yan

(10) Patent No.: US 12,062,205 B2
(45) Date of Patent: Aug. 13, 2024

(54) CAMERA POSE DETERMINATION METHOD AND APPARATUS, AND ELECTRONIC DEVICE

(71) Applicant: NANJING INSTITUTE OF ADVANCED ARTIFICIAL INTELLIGENCE, LTD., Jiangsu (CN)

(72) Inventor: Qinrui Yan, Nanjing (CN)

(73) Assignee: NANJING INSTITUTE OF ADVANCED ARTIFICIAL INTELLIGENCE, LTD., Nanjing (CN)

( * ) Notice: Subject to any disclaimer, the term of this patent is extended or adjusted under 35 U.S.C. 154(b) by 517 days.

(21) Appl. No.: 17/289,965

(22) PCT Filed: Aug. 5, 2019

(86) PCT No.: PCT/CN2019/099204
§ 371 (c)(1),
(2) Date: Apr. 29, 2021

(87) PCT Pub. No.: WO2020/107930
PCT Pub. Date: Jun. 4, 2020

(65) Prior Publication Data
US 2022/0012909 A1 Jan. 13, 2022

(30) Foreign Application Priority Data
Nov. 29, 2018 (CN) .......... 201811447308.5

(51) Int. Cl.
*G06T 7/73* (2017.01)
(52) U.S. Cl.
CPC ...... *G06T 7/73* (2017.01); *G06T 2207/10016* (2013.01); *G06T 2207/30244* (2013.01)

(58) Field of Classification Search
CPC ............ G06T 7/73; G06T 2207/10016; G06T 2207/30244; G06T 7/70;
(Continued)

(56) References Cited

U.S. PATENT DOCUMENTS

| | | | |
|---|---|---|---|
| 2002/0191862 A1* | 12/2002 | Neumann | G06T 7/80 382/284 |
| 2012/0120199 A1* | 5/2012 | Ben Himane | G06T 7/75 348/46 |

(Continued)

FOREIGN PATENT DOCUMENTS

| | | |
|---|---|---|
| CN | 104361575 A | 2/2015 |
| CN | 104374395 A | 2/2015 |

(Continued)

OTHER PUBLICATIONS

Chinese first Search Report dated Apr. 4, 2020 for related Chinese Appln. No. 2018114473085; 2 Pages.

(Continued)

*Primary Examiner* — Nimesh Patel
(74) *Attorney, Agent, or Firm* — Brooks Kushman P.C.

(57) ABSTRACT

Disclosed are camera pose determination methods and apparatuses. The method includes determining first pixels in a current image and second pixels in a previous image, determining second pixel points with the preconfigured semantics in a previous image frame before the current image frame, the first pixel points corresponding to at least a portion of the second pixel points, determining an error between the first pixel points and the second pixel points, and a camera pose change value of the current image frame relative to the previous image frame based on the error, and determining a camera pose of the current image based on a (Continued)

camera pose of the previous image and the camera pose change. Related devices and storage media are also disclosed.

15 Claims, 4 Drawing Sheets

(58) Field of Classification Search
CPC . G06T 2207/10044; G06T 2207/30236; G06T 2207/10028; G06T 2207/20081; G06T 2207/20084; G06T 7/11; G06T 2207/30252; G06T 17/00; G06T 7/80; G06T 7/246; G06T 17/05; G06T 7/20; G06T 7/50; G06T 7/32; G06T 2207/30261; G06T 7/75; G06T 2207/10012; G06T 7/0002; G06T 5/006; G06T 7/194; G06T 7/10; G06T 7/00; G06T 7/0012; G06T 2200/04; G06T 2207/20076; G06T 3/4038; G06T 5/002; G06T 7/55; G06T 7/579; G06T 15/005; G06T 2207/20021; G06T 7/593; G06T 15/00; G06T 15/506; G06T 2207/10004; G06T 2207/10048; G06T 2207/30248; G06T 7/33; G06T 7/85; G06T 7/292; G06T 13/20; G06T 2207/10021; G06T 2207/30004; G06N 3/08; G06N 3/045; G06N 20/00; G06N 3/044; G06N 3/04; G06N 3/02; G06N 3/082; G06N 3/042; G06V 10/82; G06V 20/64; G06V 20/58; G06V 10/764; G06V 20/584; G06V 20/582; G06V 2201/08; G06V 20/56; G06V 20/52; G06V 20/00; G06V 20/10; G06V 10/242; G06V 10/25; G06V 40/172; G06V 10/776; G06V 10/771; G06V 20/39; G06V 20/44; G06V 20/53; G06V 20/653; G06V 2201/10; G06V 30/19173; G06V 40/19; G06V 40/20; G06V 40/45; G06F 3/017; G06F 3/011; G06F 18/23; G06F 18/00; G06F 18/24; G06F 16/954; G06F 16/5854; G06F 18/28; G06F 40/30; G06F 17/153; G06F 16/283; Y02T 10/40; Y02T 10/70; Y02T 50/60; Y02T 10/7072; Y02T 90/14; H04W 4/029; H04W 52/0209; H04W 4/02; H04W 24/00; H04W 4/44; H04W 4/50; H04W 28/04; H04W 4/38; H04W 4/40; H04W 4/70; H04W 64/00

See application file for complete search history.

(56) References Cited

U.S. PATENT DOCUMENTS

| | | | |
|---|---|---|---|
| 2014/0050357 A1* | 2/2014 | Benhimane | G06T 7/579 382/103 |
| 2014/0241617 A1* | 8/2014 | Shotton | G06F 18/214 382/159 |
| 2015/0332464 A1* | 11/2015 | O'Keefe | H04N 13/128 348/47 |
| 2016/0321811 A1* | 11/2016 | Benhimane | G06T 7/70 |
| 2017/0148155 A1* | 5/2017 | Wei | H04N 23/10 |
| 2018/0192035 A1* | 7/2018 | Dabeer | G06V 20/588 |
| 2019/0051056 A1* | 2/2019 | Chiu | G06F 16/903 |
| 2019/0204084 A1* | 7/2019 | Song | G06T 7/579 |

FOREIGN PATENT DOCUMENTS

| | | |
|---|---|---|
| CN | 104732518 A | 6/2015 |
| CN | 106447730 A | 2/2017 |
| CN | 106652028 A | 5/2017 |
| CN | 107123142 A | 9/2017 |
| CN | 107144285 A | 9/2017 |
| CN | 107145578 A | 9/2017 |
| CN | 107160395 A | 9/2017 |
| CN | 107747941 A | 3/2018 |
| CN | 108682038 A | 10/2018 |
| CN | 109544629 A | 3/2019 |
| JP | 2015149675 A | 8/2015 |

OTHER PUBLICATIONS

Chinese supplemental Search Report dated Oct. 26, 2020, for related Chinese Appln. No. 2018114473085; 1 Page.
International Search Report dated Nov. 6, 2019 for related PCT Appln. No. PCT/CN2019/099204; 2 Pages.

* cited by examiner

CAMERA POSE DETERMINATION METHOD AND APPARATUS, AND ELECTRONIC DEVICE

CROSS-REFERENCE TO RELATED APPLICATIONS

This application is the U.S. national phase of PCT Application No. PCT/CN2019/099204 filed on Aug. 5, 2019, which claims priority to Chinese Patent Application No. 201811447308.5, filed on Nov. 29, 2018, which are incorporated herein by reference in their entireties.

TECHNICAL FIELD

The present disclosure relates to a camera pose determination method and apparatus, and an electronic device.

BACKGROUND

Methods for calculating a visual mileage have been applied widely in a field of navigating a robot and an unmanned vehicle, such as an intelligent vehicle, an unmanned drone, and so on. In such methods, a distance and direction of a motion may be measured based on visual information, so that both measurement mistakes due to skidding of a vehicle with a wheel odometer and measurement errors due to factors such as a sensor precision reduction may be avoided, and measurement precision may be improved.

The method for calculating the vision mileage includes calculating a camera pose, usually in a manner of minimizing a reprojection error. Corner point extraction and feature matching are performed in the procedure to minimize the reprojection error. If the extracted corner points are too sparse, a map may become sparse so that a mistake in the feature matching may easily lead to a system failure. Moreover, it is difficult to determine thresholds for filtering of the feature matching and for rejection of false matching.

A method for determining the camera pose accurately is thus expected.

SUMMARY

Embodiments of the present disclosure provide camera pose determination methods and apparatuses, and related electronic devices, mobile devices, and computer readable media, through which the camera poses may be calculated without influences from individual differences among cameras and may be calculated with an improved accuracy.

In an aspect, disclosed is a camera pose determination method. The method may include determining first pixel points with preconfigured semantics in a current image frame sampled by a camera, determining second pixel points with the preconfigured semantics in a previous image frame before the current image frame, the first pixel points corresponding to at least a portion of the second pixel points, determining an error between the first pixel points and the second pixel points, the error including a semantic error, determining a camera pose change value of the current image frame relative to the previous image frame based on the error, and determining a camera pose corresponding to the current image frame based on a camera pose corresponding to the previous image frame and the camera pose change value of the current image frame relative to the previous image frame.

In another aspect, disclosed is a camera pose determination apparatus. The apparatus may include an image receiving circuit configured to receive a current image frame from a camera, a pixel point determining circuit configured to determine first pixel points with preconfigured semantics in the current image frame and second pixel points with the preconfigured semantics in a previous image frame, the first pixel points corresponding to at least a portion of the second pixel points, a pose change value determining circuit configured to determine an error between the first pixel points and the second pixel points, and to determine a camera pose change value of the current image frame relative to the previous image frame based on the error, the error including a semantic error, and a pose determining circuit configured to determine a camera pose corresponding to the current image frame based on a camera pose corresponding to the previous image frame and the camera pose change value of the current image frame relative to the previous image frame.

In another aspect, disclosed is an electronic device. The electronic device includes a processor and a memory. The memory has computer program instructions stored. The computer program instructions may cause the processor to execute the above camera pose determination method, when being executed by the processor.

In another aspect, disclosed is a mobile device. The mobile device includes the above electronic device.

In another aspect, disclosed is a computer readable storage medium. The computer readable storage medium has computer program instructions stored. The computer program instructions cause the processor to execute the above camera pose determination method, when being executed by a processor.

Through the camera pose determination methods and apparatuses, and related electronic devices, mobile devices, and computer readable media according to the embodiments of the present disclosure, for example, the first pixel points with preconfigured semantics in the current image frame sampled by the camera may be determined, and the second pixel points with the preconfigured semantics in the previous image frame before the current image frame may be determined, wherein the first pixel points correspond to at least a portion of the second pixel points. Further, the error between the first pixel points and the second pixel points may be determined, where the error may include the semantic error. Then, the camera pose change value of the current image frame relative to the previous image frame may be determined based on the error, and the camera pose corresponding to the current image frame may be obtained based on the camera pose corresponding to the previous image frame and the camera pose change value of the current image frame relative to the previous image frame. Thus, for example, a calculation may be performed directly on a semantic segmentation result, which may be more robust than a calculation on gray points, through which influences from individual differences among the cameras may be avoided.

BRIEF DESCRIPTION OF THE DRAWINGS

The above and other objects, features and advantages of the present disclosure will become more obvious by describing the embodiments of the present disclosure in more details with reference to the drawings. The drawings provide further understanding of the embodiments of the present disclosure and constitute a portion of the specification. The drawings, together with the embodiments of the present disclosure, are used to explain this disclosure but do not constitute restrictions on the disclosure. In the drawings, the same reference number generally refers to the same portion or step.

DETAILED DESCRIPTION

Hereinafter, exemplary embodiments according to the present disclosure will be described in details with reference to the drawings. It is obvious that the described embodiments are some embodiments of the present disclosure rather than all, and it is appreciated that the present disclosure is not limited to the exemplary embodiments described herein.

As described above, in a method for calculating a visual mileage, relative motion parameters of the camera are calculated by optimizing the reprojection error, so as to obtain a pose or position of the camera at the current moment. However, in such method, corner points are extracted and feature matching are performed. Thus, the map may become sparse if the extracted corner points are too sparse, and a mistake in the feature matching may easily lead to a system failure. Therefore, it is expected to provide an improved method for determining camera poses, which may be not influenced by the individual differences among cameras.

Embodiments of the present disclosure provide methods and apparatuses for determining camera poses, and related electronic devices, mobile devices, and computer readable media, where an inter-frame pose change may be calculated directly based on semantic labels, through which, for example, influences from individual differences among cameras may be avoided, analyzability and testability for visual positioning results may be enhanced, and an influence on the final positioning result from each category of elements in the image may also be analyzed.

It is appreciated that the embodiments of the present disclosure are not limited to the fields of navigation of a robot and unmanned vehicle, but may also be applied to other fields such as blind navigation.

Various non-limiting embodiments of the present disclosure will be now described below with reference to the drawings.

Figure 1:
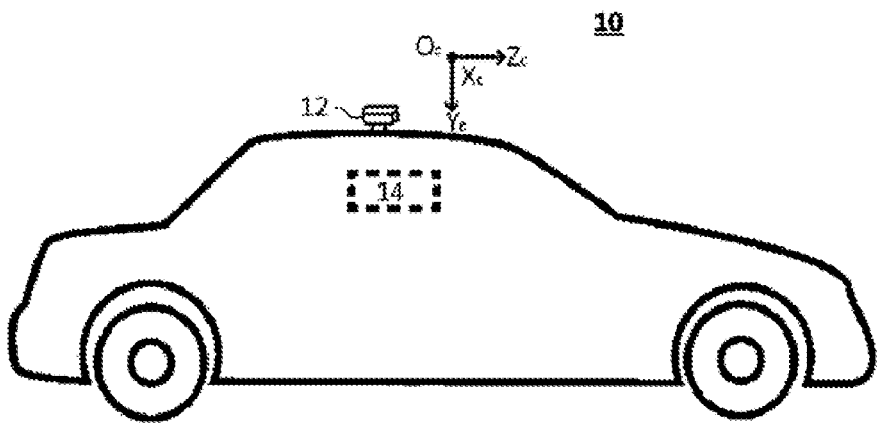
FIG. 1 shows a schematic diagram of an application scenario of the camera pose determination method according to an embodiment of the present disclosure.

FIG. 1 shows a schematic diagram of an application scenario of the camera pose determination method according to an embodiment of the present disclosure.

As shown in FIG. 1, a vehicle 10 may include a vehicular camera 12. Here, the vehicular camera 12 may also be a monocular camera, or a binocular camera, or a multi-ocular camera. As shown in FIG. 1, the vehicular camera 12 is mounted on the top of the vehicle 10. However, it is appreciated that the vehicular camera 12 may also be fixed at any other suitable position of the vehicle 10, for example, at the head portion, or on the front windshield, or the like.

It is also appreciated that a coordinate system shown in FIG. 1 is a local coordinate system (Xc, Yc, Zc) of the vehicular camera, where a direction of the Zc axis is a direction of an optical axis of the vehicular camera, a direction of the Yc axis is a downward direction perpendicular to the Zc axis, and a direction of the Xc axis is a direction perpendicular to the Yc axis and the Zc axis.

Here, the vehicle 10 may include a pose determining apparatus 14. The vehicular camera 12 may capture multiple frames of images (or image frames) continuously, and the pose determining apparatus 14 may calculate a rotation matrix R and a translation matrix T of the vehicular camera 12 for each image frame, wherein the translation matrix T is a 3*1 matrix representing a position of the vehicular camera 12 currently relative to a position of origin, and the rotation matrix R is a 3*3 matrix representing a current posture of the vehicular camera 12. The rotation matrix R may also be represented in Euler angles ($\psi$, $\theta$, $\varphi$), wherein $\psi$ represents a yaw rotated around the Yc axis, $\theta$ represents a pitch rotated around the Xc axis, and $\varphi$ represents a roll rotated around the Zc axis.

Figure 2:
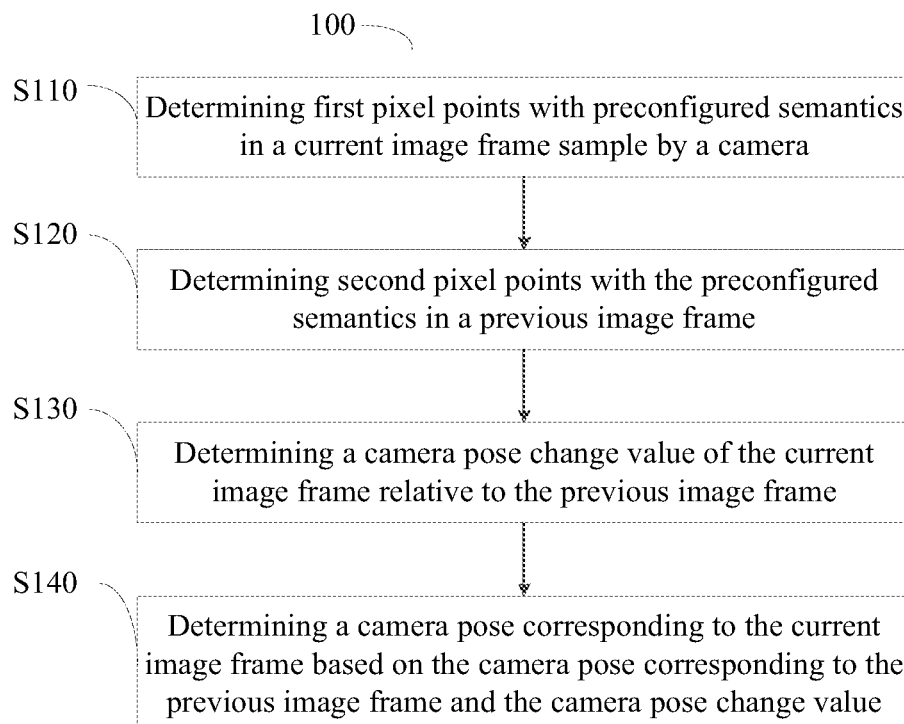
FIG. 2 shows a flowchart of the camera pose determination method according to an embodiment of the present disclosure.

FIG. 2 shows a flowchart of the camera pose determination method according to an embodiment of the present disclosure.

As shown in FIG. 2, the camera pose determination method 100 according to an embodiment of the present disclosure includes a step S110 of determining first pixel points with preconfigured semantics in a current image frame sampled by a camera.

Here, the camera may be of any suitable type, and may be a camera such as a monocular camera, or a binocular camera, or a multi-ocular camera, or the like. For example, image data sampled by the camera may be a sequence of continuous image frames (i.e. a video stream) or a sequence of discrete image frames (i.e. a set of image data sampled at predetermined sampling time points) or the like. In addition, the camera may be used to capture, for example, grayscale images, or color images with color information. Any other type of camera, which is either known in the art or possibly developed in the future, may be applied to the present disclosure. Any suitable manner of capturing images may be adopted in present disclosure as long as clear images may be obtained.

In an embodiment, objects belonging to preconfigured semantics in an image may be recognized based on a trained neural network model, for example. Each object may correspond to a probability value that it belongs to the preconfigured semantics. For example, a semantic segmentation may be performed on the current image frame sampled by the camera, so as to determine the semantics of each pixel point in the current image frame.

The image may include a plurality of pixel points. Image semantics refers to the meaning of image contents. The preconfigured semantics in the present disclosure refers to preconfigured image semantics, such as a pedestrian, a vehicle, a tree, a traffic sign, or the like, which is included in the images.

The method 100 may further include a step S120 of determining second pixel points with the preconfigured semantics in a previous image frame before the current image frame, where the first pixel points may correspond to at least a portion of the second pixel points.

The previous image frame is an image before the current image frame. The current image frame and the previous image frame may be spaced by one image frame, two image frames, or a plurality of image frames. For example, the previous image frame may be the previous one image frame of the current image frame. During sampling the previous image frame and the current image frame, the camera may move a distance, that is, a translational displacement may be generated.

The semantics of each pixel point in the current image frame and the semantics of each pixel point in the previous image frame may be retrieved, and corresponding pixel points in the current image frame and the previous image frame may be matched, wherein the first pixel points in the current image frame may correspond at least partially to the second pixel points in the previous image frame. That is, the pixel points in the current image frame and the pixel points in the previous image frame may overlap at least partially. In other words, it is possible that not all pixel points in the current image frame have corresponding pixel points in the previous image frame. The pixel points in the current image frame may correspond to a portion of the pixel points in the previous image frame, and the semantics of the pixel points in the current image frame may not correspond to a portion of the pixel points in the previous image frame. For example, the current image frame includes all pixel points of a pedestrian, while the previous image frame includes only a portion of the pixel points of the pedestrian. For example, the current image frame includes a portion of the pixel points of a pedestrian, while the previous image frame includes all pixel points of the pedestrian.

The method 100 further includes a step S130 of determining an error between the first pixel points and the second pixel points, and determining a camera pose change value of the current image frame relative to the previous image frame based on the error, where the error includes a semantic error.

The semantic error refers to a difference between probability values that the first pixel points in the current image frame belong to the preconfigured semantics and probability values that corresponding second pixel points in the previous image frame belong to the preconfigured semantics. In other words, the semantic error between the first pixel points in the current image frame and the second pixel points in the previous image frame refers to a difference between confidences of the corresponding first pixel points in the current image frame and the second pixel points in the previous image frame.

Here, the semantic error is represented by a pose parameter of the camera, and the camera pose change value of the current image frame relative to the previous image frame may be obtained by minimizing the semantic error. For example, the camera relative pose change value of the current image frame relative to the previous image frame may be a camera pose change increment of the current image frame relative to the previous image frame.

The method 100 may further include a step S140 of determining a camera pose corresponding to the current image frame based on the camera pose corresponding to the previous image frame and the camera pose change value of the current image frame relative to the previous image frame.

In the step S140, the camera pose of the camera when sampling the previous image frame and the camera pose change value of the current image frame relative to the previous image frame have been obtained, and the camera pose corresponding to the current image frame may be obtained by adding the camera pose change value of the current image frame relative to the previous image frame onto the camera pose corresponding to the previous image frame.

By adopting the camera pose determination method according to the embodiment, for example, the pose parameter may be calculated directly from the semantic segmentation result, so that the influence from individual differences among cameras is avoided and more accurate pose parameters are obtained.

In an example, the error may further include a photometric error and/or a reprojection error. Thus, the error may include only the semantic error, or may further include the photometric error or the reprojection error, or may further include both the photometric error and the reprojection error. That is, the error may include the semantic error, or both the semantic error and the photometric error, or both the semantic error and the reprojection error, or the semantic error together with the photometric error and the reprojection error.

A calculation of the reprojection error may include establishing a feature matching relationship between two images, for example, the current image frame and the previous image frame in the present disclosure, calculating three-dimensional coordinates of matching point pairs to obtain a three-dimensional correspondence of the matching point pairs, and calculating the reprojection error according to the three-dimensional coordinates and the three-dimensional correspondence of matching point pairs by $d^2(p_i, Mq_i) = \|p_i - Mq_i\|^2$, where $p_i$ and $q_i$ represent respectively homogeneous coordinates corresponding to a spatial point $p_i$ and an image point $q_i$, and where M is a projection matrix which is formed by a camera internal parameter matrix K, a relative motion parameter rotation matrix R, and a three-dimensional translation vector t, $$\text{i.e. } M = [K\ 0]\begin{bmatrix} R & t \\ 0 & 1 \end{bmatrix}.$$

Any known method suitable for obtaining and calculating the reprojection error between different images may be adopted in the present disclosure, details of which are omitted herein.

In addition, any known method suitable for obtaining and calculating the photometric error between different images may be adopted in the present disclosure, details of which are also omitted herein.

In this example, by superimposing the photometric error and/or the reprojection error on the semantic error, the possibility of falling into a local optimum due to an individual optimization of the photometric error or reprojection error may be lowered, such that the relative pose change value of the current image frame relative to the previous image frame becomes more accurate.

Figure 3:
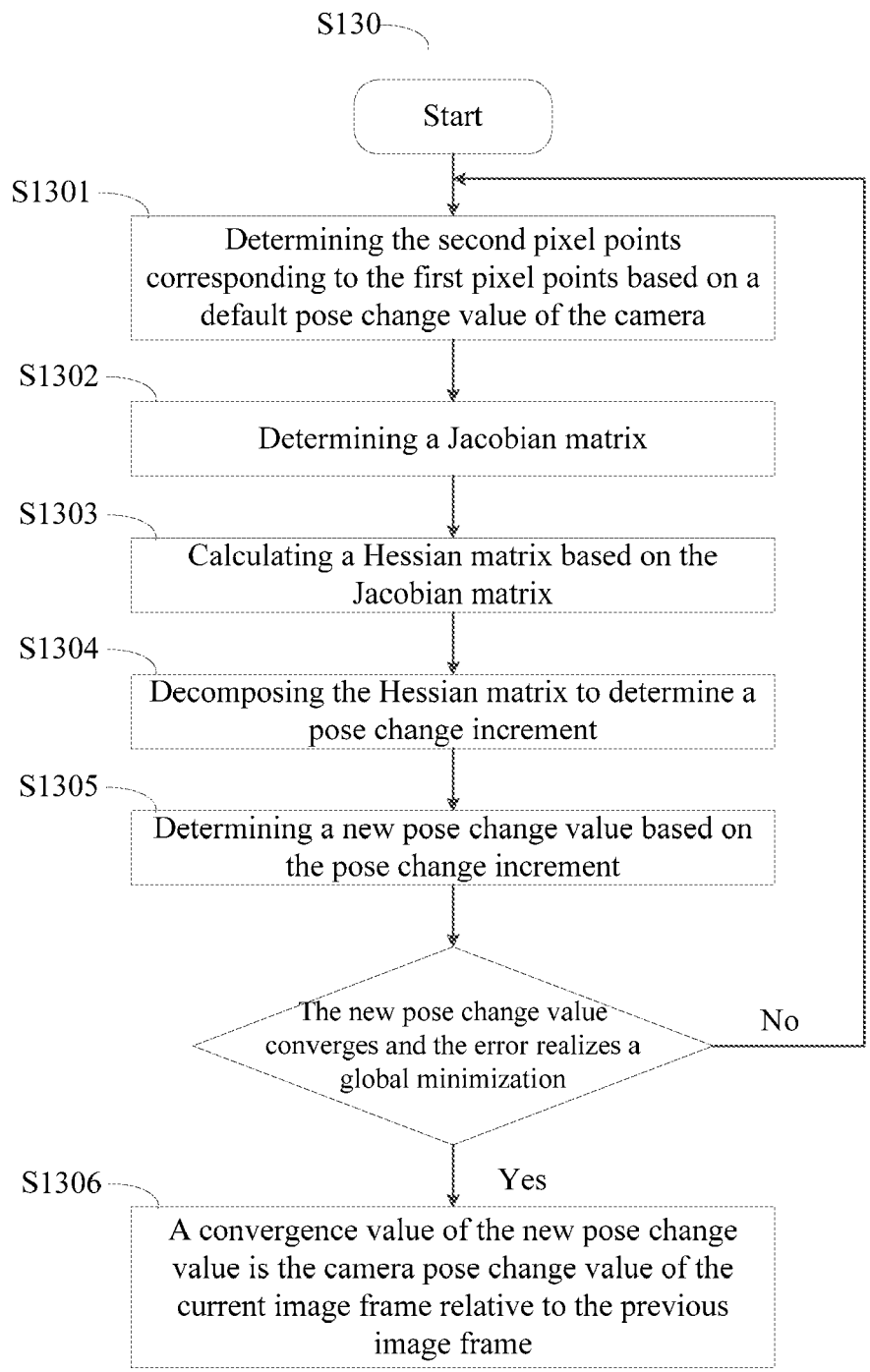
FIG. 3 shows a flowchart of a step S120 of the camera pose determination method according to an embodiment of the present disclosure.

In an example, as shown in FIG. 3, the step S130 may include a step S1301 of determining the second pixel points corresponding to the first pixel points based on a default pose change value of the camera.

In the step S1301, it is determined which pixel points in the previous image frame correspond to the first pixel point in the current image frame, that is, the correspondence between the pixel points of the current image frame and the pixel points of the previous image frame may be determined.

In an example, if the previous image frame is the initial image frame, a default pose change value of the camera may be the camera pose change value associated with the previous image frame. Here, if the previous image frame is an initial image frame sampled at a starting point by the camera, the pose parameter of the camera at this moment is a known initial parameter, and the default pose change value of the camera may be, for example, an initial pose or zero, or a value assigned by experiences, or an arbitrary value. In this example, the camera pose corresponding to the current image frame may be determined purely by using relative pose changes among multiple image frames, so that a cost for obtaining the camera pose may be reduced.

In an example, if the previous image frame is an image other than the initial image frame, the default pose change value of the camera may be a camera pose change value determined by a sensor associated with the camera. For example, the default change value of the camera is determined by a visual odometer, a chassis encoder, and the like. In this example, an initial value for calculating iteratively the camera pose change value may be obtained quickly by using an external sensor.

The step S130 may further include a step S1302 of calculating a first-order partial derivative of the error between the first pixel points and the corresponding second pixel points to the default pose change value of the camera, so as to determine a Jacobian matrix.

In the step S1302, the error between the first pixel points and the second pixel points is calculated, and then the Jacobian matrix is determined by calculating the first-order partial derivative of the error to the default pose change value of the camera.

The step S130 may further include a step S1303 of calculating a Hessian matrix based on the Jacobian matrix.

In an example, a product of a transpose of the Jacobian matrix and the Jacobian matrix is calculated to obtain the Hessian matrix. In this example, the Hessian matrix is obtained by calculating the product of the transpose of the Jacobian matrix and the Jacobian matrix, so that the Hessian matrix may be calculated easily and quickly with a clear logic.

In an example, the Hessian matrix may be obtained by calculating the first-order partial derivative of the Jacobian matrix to the default pose change value of the camera, or a second-order partial derivative of the error to the default pose change value of the camera. In this example, the default pose change value of the camera may be processed by using the same processor and thus both usage of the processor and calculation cost may be reduced.

The step S130 may further include a step S1304 of decomposing the Hessian matrix to determine a pose change increment, and a step S1305 of determining a new pose change value based on the pose change increment.

Here, the pose change increment refers to an increment of the pose change value of the current image frame relative to the previous image frame, and the new pose change value refers to a sum of the pose change value before obtaining the pose change increment and the pose change increment, for example, a vector sum of the pose change value before obtaining the pose change increment and the pose change increment.

If the new pose change value does not converge or the error does not realize a global minimization, the above steps may be performed iteratively by using the new pose change value, until the new pose change value converges and the error realizes global minimization, and then a step S1306 may be proceeded.

In the step S1306, a convergence value of the new pose change value is determined as the camera pose change value of the current image frame relative to the previous image frame.

Figure 4:
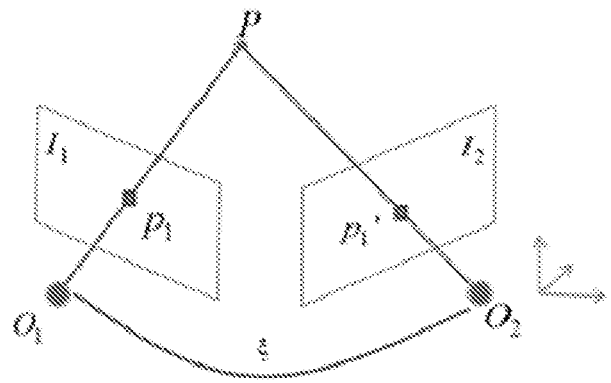
FIG. 4 shows a schematic diagram of a projection of the same physical point on two image frames.

For example, the obtaining of the camera pose change corresponding to the current image frame will be briefly described below with reference to FIG. 4. As shown in FIG. 4, for a point on a subject or object, p1 and p1' are two pixel points projected on the previous image frame I1 and the current image frame 12, respectively, which are corresponding to each other. The pixel point p1 is transformed into the pixel point p1' with a displacement, by $\xi$ transformation from an O1 camera coordinate system on the previous image frame I1 to an O2 camera coordinate system on the current image frame 12. For example, three semantic labels or category objects, e1, e2, and e3, are assumed as being of interest.

The semantic error between the pixel points p1 and p1' is $e(\xi)=S(p1')-S(p1)=e(e1, e2, e3)$, where $S(p1)$ and $S(p1')$ represent the semantics of the pixel points p1 and p1', respectively, $e(\xi)$ represents the semantic error between pixel points p1 and p1', and 4 is a representation of Lie Group T in Lie Algebra and is a 6×1 vector, ($\xi1, \xi2, \xi3, \xi4, \xi5, \xi6$).

The Jacobian matrix of a single pixel point is obtained by calculating the first-order derivative of $e(\xi)$ to $\xi$, as follows.

$$J(\xi) = \frac{\partial e(\xi)}{\partial \xi} = \begin{bmatrix} \frac{\partial e1}{\partial \xi 1} & \frac{\partial e1}{\partial \xi 2} & \frac{\partial e1}{\partial \xi 3} & \frac{\partial e1}{\partial \xi 4} & \frac{\partial e1}{\partial \xi 5} & \frac{\partial e1}{\partial \xi 6} \\ \frac{\partial e2}{\partial \xi 1} & \frac{\partial e2}{\partial \xi 2} & \frac{\partial e2}{\partial \xi 3} & \frac{\partial e2}{\partial \xi 4} & \frac{\partial e2}{\partial \xi 5} & \frac{\partial e2}{\partial \xi 6} \\ \frac{\partial e3}{\partial \xi 1} & \frac{\partial e3}{\partial \xi 2} & \frac{\partial e3}{\partial \xi 3} & \frac{\partial e3}{\partial \xi 4} & \frac{\partial e3}{\partial \xi 5} & \frac{\partial e3}{\partial \xi 6} \end{bmatrix}$$

The Hessian matrix is obtained by multiplying a transposition of $J(\xi)$ and $J(\xi)$ as follows.

$$H(\xi) = J(\xi)T J(\xi) = \begin{bmatrix} \frac{\partial e1}{\partial \xi 1} & \frac{\partial e2}{\partial \xi 1} & \frac{\partial e3}{\partial \xi 1} \\ \frac{\partial e1}{\partial \xi 2} & \frac{\partial e2}{\partial \xi 2} & \frac{\partial e3}{\partial \xi 2} \\ \frac{\partial e1}{\partial \xi 3} & \frac{\partial e2}{\partial \xi 3} & \frac{\partial e3}{\partial \xi 3} \\ \frac{\partial e1}{\partial \xi 4} & \frac{\partial e2}{\partial \xi 4} & \frac{\partial e3}{\partial \xi 4} \\ \frac{\partial e3}{\partial \xi 4} & \frac{\partial e2}{\partial \xi 5} & \frac{\partial e3}{\partial \xi 5} \\ \frac{\partial e1}{\partial \xi 6} & \frac{\partial e2}{\partial \xi 6} & \frac{\partial e3}{\partial \xi 6} \end{bmatrix} \begin{bmatrix} \frac{\partial e1}{\partial \xi 1} & \frac{\partial e1}{\partial \xi 2} & \frac{\partial e1}{\partial \xi 3} & \frac{\partial e1}{\partial \xi 4} & \frac{\partial e1}{\partial \xi 5} & \frac{\partial e1}{\partial \xi 6} \\ \frac{\partial e2}{\partial \xi 1} & \frac{\partial e2}{\partial \xi 2} & \frac{\partial e2}{\partial \xi 3} & \frac{\partial e2}{\partial \xi 4} & \frac{\partial e2}{\partial \xi 5} & \frac{\partial e2}{\partial \xi 6} \\ \frac{\partial e3}{\partial \xi 1} & \frac{\partial e3}{\partial \xi 2} & \frac{\partial e3}{\partial \xi 3} & \frac{\partial e3}{\partial \xi 4} & \frac{\partial e3}{\partial \xi 5} & \frac{\partial e3}{\partial \xi 6} \end{bmatrix} =$$

$$\begin{bmatrix} \frac{\partial e1}{\partial \xi 1} \times \frac{\partial e1}{\partial \xi 1} + \frac{\partial e2}{\partial \xi 1} \times \frac{\partial e2}{\partial \xi 1} + \frac{\partial e3}{\partial \xi 1} \times \frac{\partial e3}{\partial \xi 1} & \cdots & \frac{\partial e1}{\partial \xi 6} \times \frac{\partial e1}{\partial \xi 6} + \frac{\partial e2}{\partial \xi 6} \times \frac{\partial e2}{\partial \xi 6} + \frac{\partial e3}{\partial \xi 6} \times \frac{\partial e3}{\partial \xi 6} \\ & \cdots & \\ & \cdots & \\ \frac{\partial e1}{\partial \xi 6} \times \frac{\partial e1}{\partial \xi 1} + \frac{\partial e2}{\partial \xi 6} \times \frac{\partial e2}{\partial \xi 1} + \frac{\partial e3}{\partial \xi 6} \times \frac{\partial e3}{\partial \xi 1} & \cdots & \frac{\partial e1}{\partial \xi 6} \times \frac{\partial e1}{\partial \xi 6} + \frac{\partial e2}{\partial \xi 6} \times \frac{\partial e2}{\partial \xi 6} + \frac{\partial e3}{\partial \xi 6} \times \frac{\partial e3}{\partial \xi 6} \end{bmatrix}$$

A 1×6 vector, i.e. the pose change increment $\Delta$, is obtained by decomposing the Hessian matrix, for example through triangular decomposition, full-rank decomposition, QR decomposition, Jordan decomposition, SVD decomposition, or the like. A new pose change value $\xi_{new}$ is obtained by adding the pose change increment $\Delta$ to the current pose change value $\xi$ or the default pose change value of the camera. The above steps are performed iteratively by using the new pose change value $\xi_{new}$ until the new pose change value $\xi_{new}$ converges and the error $e(\xi)$ realizes the global minimization, and the convergence value of the new pose change value $\xi_{new}$ is the camera pose change value of the current image frame relative to the previous image frame. The sum of the camera pose change value of the current image frame relative to the previous image frame and the camera pose corresponding to the previous image frame is the camera pose corresponding to the current image frame.

Examples for obtaining the pose parameter of the camera for a single pixel point have been described briefly above. In a case of a plurality of pixel points, for each pixel point, a single pixel point semantic error may be obtained and a Jacobian matrix and a Hessian matrix may be obtained. Then, the pose change increment may be obtained by a semantic error, a Jacobi matrix and a Hessian matrix for the plurality of pixel points which are obtained by superimposing those single pixel point semantic errors, respective Jacobian matrices and Hessian matrices, respectively. A new pose change value $\xi_{new}$ is obtained by adding the pose change increment $\Delta$ to the current pose change value $\xi$ or the default pose change value of the camera. The above steps are performed iteratively by using the new pose change value $\xi_{new}$ until the new pose change value $\xi_{new}$ converges and the error $e(\xi)$ realizes the global minimization. The convergence value of the new pose change value $\xi_{new}$ is the camera pose change value of the current image frame relative to the previous image frame. The sum of the camera pose change value of the current image frame relative to the previous image frame and the camera pose corresponding to the previous image frame is the camera pose corresponding to the current image frame.

Thus, according to the camera pose determination method of embodiments of the present disclosure, on the basis of the semantic segmentation of images, the inter-frame pose transformation is calculated directly based on the semantic label, through which an influence from individual differences among cameras is avoided, which may also facilitate to further add associations among objects into a positioning system.

Figure 5:
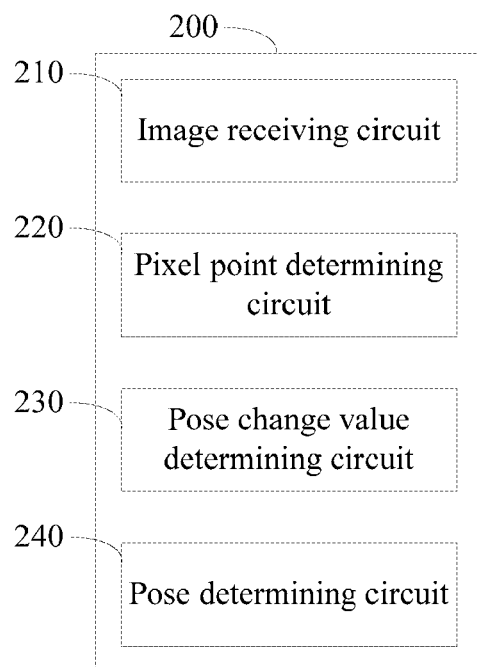
FIG. 5 shows a block diagram of the camera pose determination apparatus according to an embodiment of the present disclosure.

FIG. 5 shows a block diagram of a camera pose determination apparatus according to the embodiments of the present disclosure.

As shown in FIG. 5, the camera pose determination apparatus 200 according to the embodiments of the present disclosure includes an image receiving circuit 210 configured to receive a current image frame from the camera, a pixel point determining circuit 220 configured to determine first pixel points with preconfigured semantics in the current image frame and second pixel points with the preconfigured semantics in a previous image frame, the first pixel points corresponding at least partially to the second pixel points, a pose change value determining circuit 230 configured to determine an error between the first pixel points and the second pixel points and to determine a camera pose change value of the current image frame relative to the previous image frame based on the error, the error including a semantic error, and a pose determining circuit 240 configured to determine a camera pose corresponding to the current image frame based on a camera pose corresponding to the previous image frame and the camera pose change value of the current image frame relative to the previous image frame.

In an example, in the apparatus 200, the semantic error refers to a difference between a probability value that the first pixel points in the current image frame belong to the preconfigured semantics and a probability value that the corresponding second pixel points in the previous image frame belong to the preconfigured semantics.

In an example, in the apparatus 200, the error further includes one or both of a photometric error and a reprojection error, and the pose change value determining circuit 230 is further configured to determine one or both of the photometric error and the reprojection error.

Figure 6:
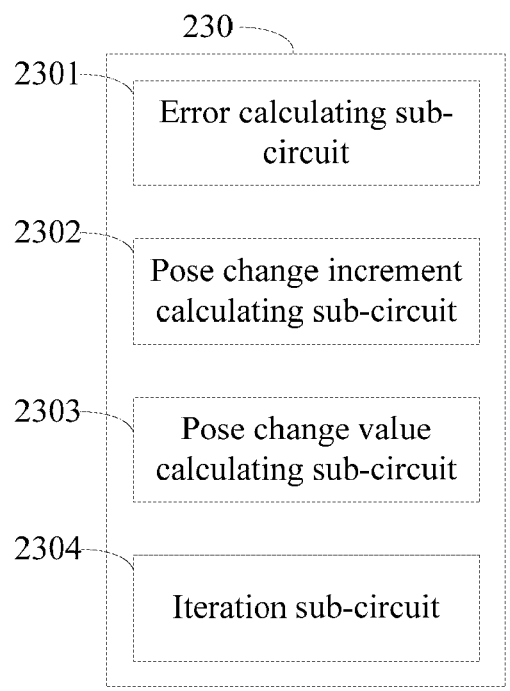
FIG. 6 shows a block diagram of the pose change value determining circuit according to an embodiment of the present disclosure.
Figure 7:
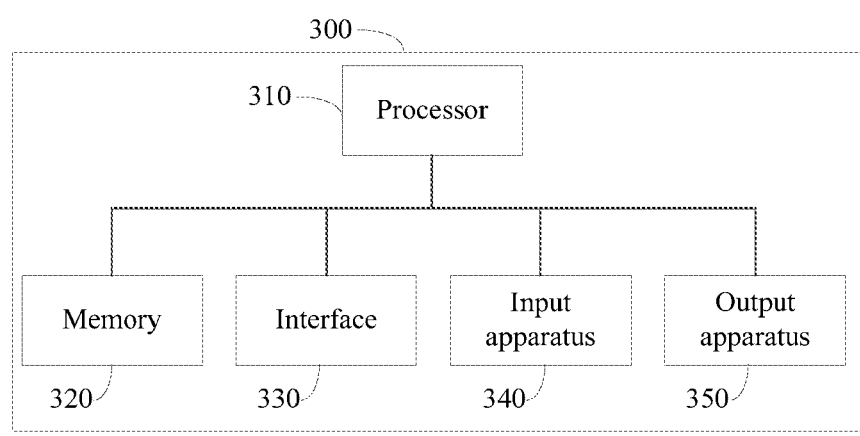
FIG. 7 shows a block diagram of an electronic device according to an embodiment of the present disclosure.

In an example, in the apparatus 200, as shown in FIG. 6, the pose change value determining circuit 230 further includes an error calculating sub-circuit 2301 configured to determine the second pixel points at least partially corresponding to the first pixel points based on a default pose change value of the camera, and to calculate the error between the first pixel points and the corresponding second pixel points, a pose change increment calculating sub-circuit 2302 configured to calculate a Jacobian matrix and a Hessian matrix based on the error between the first pixel points and the second pixel points and further to calculate a pose change increment, a pose change value calculating sub-circuit 2303 configured to determine a new pose change value based on the pose change increment, and an iteration sub-circuit 2304 configured to iterate by using the new pose change value until the new pose change value converges and the error realizes a global minimization, the convergence value of the new pose change value being the camera pose change value of the current image frame relative to the previous image frame.

In another example, in the apparatus 200, the default pose change value of the camera is the camera pose change value associated with the previous image frame, or is a camera pose change value determined by a sensor associated with the camera.

In another example, in the apparatus 200, the pose change value determining circuit 240 is further configured to calculate a product of the transpose of the Jacobian matrix and the Jacobian matrix to obtain the Hessian matrix.

The functions and operations of the circuits and sub-circuits in the apparatus 200 have been introduced with reference to the method described with FIG. 1 to FIG. 4, and repetitive descriptions are therefore omitted.

FIG. 6 shows a structural block diagram of an electronic device 300 according to an embodiment of the present disclosure. The electronic device 300 will now be described with reference to FIG. 6. The electronic device 300 may be implemented as the pose determining apparatus 14 in the vehicle 10 as shown in FIG. 1, which may communicate with the vehicular camera 12 so as to receive output signals from the vehicular camera 12.

As shown in FIG. 6, the electronic device 300 may include a processor 310 and a memory 320.

The processor 310 may be a central processing unit (CPU) or any other form of processing unit having data processing capabilities and/or instruction execution capabilities, and may control other assemblies within the electronic device 300 to execute desired functions.

The memory 320 may include one or more computer program products that may include various forms of computer readable storage medium, such as volatile memory and/or non-volatile memory. The volatile memory may include, for example, a random access memory (RAM) and/or a cache, etc. The non-volatile memory may include, for example, a read only memory (ROM), a hard disk, a flash memory, etc. One or more computer program instructions may be stored on the computer readable storage medium, and the processor 310 may run the program instructions, to implement the camera pose determination method and/or other desired functions of various embodiments of the present disclosure as described above. Various contents such as camera-related information, sensor-related information, drivers, and the like may also be stored in the computer readable storage medium.

In an example, the electronic device 300 may also include an interface 330, an input apparatus 340, and an output apparatus 350. These assemblies may be interconnected by a bus system and/or other form of connection mechanism (not shown).

The interface 330 may be used to connect to a desired camera, such as a video camera. For example, the interface 330 may be a USB interface used by a camera, and may be other interfaces such as a Type-C interface. The electronic device 300 may include one or more interfaces 330 for connecting to the corresponding camera and receiving images captured from the camera for executing the above method for determining camera poses.

The input apparatus 340 may be used for receiving external inputs, for example, for receiving physical point coordinate values input by a user, and the like. In some embodiments, the input apparatus 340 may be, for example, a keyboard, a mouse, a tablet, a touch screen, and the like.

The output apparatus 350 may output calculated camera external parameters. For example, the output apparatus 350 may include a display, a speaker, a printer, and a communication network and remote output devices connected to the communication network, and the like. In some embodiments, the input apparatus 340 and the output apparatus 350 may be an integrated touch screen.

For simplicity, some of the assemblies that are relevant to the present disclosure are shown in FIG. 6, while some related peripheries or auxiliary assemblies are omitted. In addition, the electronic device 300 may also include any other suitable assemblies depending on applications.

In addition to the methods and apparatus described above, embodiments of the present disclosure may also be a computer program product, which comprises computer program instructions, and said computer program instructions, when being executed by a processor, cause the processor to execute the steps of the above camera pose determination method according to various embodiments of the present disclosure.

The computer program product may write program code for executing operations of embodiments of the present disclosure in any combination of one or more programming languages, said programming languages include object-oriented programming languages, such as Java, C++, etc., and conventional procedural programming languages, such as "C" language or similar programming languages. The program code may be executed entirely on user computing device, be partially executed on user device, be executed as a stand-alone software package, be partially executed on user computing device and be partially executed on remote computing device, or be entirely executed on remote computing device or server.

Furthermore, embodiments of the present disclosure may also be a computer readable storage medium having computer program instructions stored thereon, and said computer program instructions, when being executed by a processor, cause the processor to execute the steps of the above method for determining camera poses according to various embodiments of the present disclosure.

The computer-readable storage medium may use any combination of one or more readable media. The readable medium may be a readable signal medium or a readable storage medium. The computer-readable storage medium may include, but are not limited to, system, apparatus, or devices of electric, magnetic, optical, electromagnetic, infrared, or semiconductor, or any combination of the above. More specific examples (a non-exhaustive list) of readable storage medium include electrical connections with one or more wires, portable disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination of the above.

The present disclosure has been described above in conjunction with the embodiments. However, it is appreciated that the advantages, superiorities, and effects and so on mentioned in the present disclosure are merely examples but not intended to limit the present invention, and these advantages, superiorities, effects and so on will not be considered as essential to the embodiments of the present disclosure. In addition, the details of the foregoing disclosure are only for illustration and ease of understanding but not for limitation, and the above details do not limit the application to be implemented in the details mentioned above.

The block diagrams of devices, apparatuses, equipment, systems referred to in the present disclosure are merely illustrative examples and are not intended to require or imply that the connections, arrangements, and configurations must be made in the manner shown in the block diagram. These devices, apparatuses, equipment, systems, may be connected, arranged, or configured in any manner. Terms such as "including", comprising", "having" and the like are open words, which means "including, but not limited to" and may be used interchangeably. The terms "or" and "and" as used herein refer to the term "and/or" and may be used interchangeably, unless the context clearly dictates otherwise. The term "such as" as used herein refers to the phrase "such as but not limited to" and is used interchangeably.

It is also appreciated that in the apparatuses, equipment, and methods of the present disclosure, each component or step may be decomposed and/or recombined. These decompositions and/or recombination should be regarded as an equivalent of the present disclosure.

The above description of the disclosed aspects is provided to enable to make or use the application. Various modifications to these aspects may be made. Therefore, the present disclosure is not intended to be limited to the aspects shown herein, but rather to present the broadest scope consistent with the principles and novel features disclosed herein.

The above description has been provided for illustration and description. In addition, the description is not intended to limit the embodiments of the present disclosure to the forms disclosed herein. Although various example aspects and embodiments have been discussed above, some variations, modifications, alterations, additions and sub-combinations thereof may be recognized.

What is claimed is:

1. A camera pose determination method comprising:
    determining first pixel points with preconfigured semantics in a current image frame sampled by a camera;
    determining second pixel points with the preconfigured semantics in a previous image frame before the current image frame, the first pixel points corresponding to at least a portion of the second pixel points;
    determining an error between the first pixel points and the second pixel points, the error including a semantic error;
    determining a camera pose change value of the current image frame relative to the previous image frame based on the error; and
    determining a camera pose corresponding to the current image frame based on a camera pose corresponding to the previous image frame and the camera pose change value of the current image frame relative to the previous image frame,
    wherein determining the camera pose change value of the current image frame relative to the previous image frame comprises:
        determining the second pixel points corresponding at least partially to the first pixel points based on a default pose change value of the camera;
        determining the error between the first pixel points and the corresponding second pixel points and a Jacobian matrix by calculating a first-order partial derivative of the error relative to a default pose change value of the camera;
        calculating a Hessian matrix based on the Jacobian matrix;
        determining a pose change increment by decomposing the Hessian matrix;
        determining a new pose change value based on the pose change increment; and
        executing iteratively the above operations by using the new pose change value, until the new pose change value converges and the error realizes a global minimization, a convergence value of the new pose change value being the camera pose change value of the current image frame relative to the previous image frame.

2. The method of claim 1 wherein the semantic error refers to a difference between a probability value that the first pixel points in the current image frame belong to the preconfigured semantics and a probability value that the corresponding second pixel points in the previous image frame belong to the preconfigured semantics.

3. The method of claim 1 wherein the error further comprises a photometric error and/or a reprojection error.

4. The method of claim 1 wherein if the previous image frame is an initial image frame, the pose change value of the camera is a camera pose change value determined by a sensor associated with the camera, and if the previous image frame is an image other than the initial image frame, a default pose change value of the camera is a camera pose change value associated with the previous image frame.

5. The method of claim 1 wherein the calculating the Hessian matrix based on the Jacobian matrix comprises:
    determining the Hessian matrix based on a product of a transpose of the Jacobian matrix and the Jacobian matrix.

6. An electronic device for performing a camera pose determination comprising:
    a memory configured to store computer program instructions; and
    a processor programmed to execute the computer program instructions to cause the electronic device to perform operations including to
    determine first pixel points with preconfigured semantics in a current image frame sampled by a camera,
    determine second pixel points with the preconfigured semantics in a previous image frame before the current image frame, the first pixel points corresponding to at least a portion of the second pixel points,
    determine an error between the first pixel points and the second pixel points, the error including a semantic error,
    determine a camera pose change value of the current image frame relative to the previous image frame based on the error, and
    determine a camera pose corresponding to the current image frame based on a camera pose corresponding to the previous image frame and the camera pose change value of the current image frame relative to the previous image frame,
    wherein the processor is further programmed to:
        determine the second pixel points corresponding at least partially to the first pixel points based on a default pose change value of the camera;
        determine the error between the first pixel points and the corresponding second pixel points and a Jacobian matrix by calculating a first-order partial derivative of the error relative to a default pose change value of the camera;
        calculate a Hessian matrix based on the Jacobian matrix;
        determine a pose change increment by decomposing the Hessian matrix;
        determine a new pose change value based on the pose change increment; and
        execute iteratively the above operations by using the new pose change value, until the new pose change value converges and the error realizes a global minimization, a convergence value of the new pose change value being the camera pose change value of the current image frame relative to the previous image frame.

7. The electronic device of claim 6 wherein the semantic error refers to a difference between a probability value that the first pixel points in the current image frame belong to the preconfigured semantics and a probability value that the corresponding second pixel points in the previous image frame belong to the preconfigured semantics.

8. The electronic device of claim 6 wherein the error further comprises a photometric error and/or a reprojection error.

9. The electronic device of claim 6 wherein if the previous image frame is an initial image frame, the pose change value of the camera is a camera pose change value determined by a sensor associated with the camera, and if the previous image frame is an image other than the initial image frame, a default pose change value of the camera is a camera pose change value associated with the previous image frame.

10. The electronic device of claim 6 wherein the processor is further programmed to:
    determine the Hessian matrix based on a product of a transpose of the Jacobian matrix and the Jacobian matrix.

11. A mobile device comprising an electronic device, wherein the electronic device includes:
    a memory configured to store computer program instructions; and
    a processor programmed to execute the computer program instructions to cause the electronic device to perform operations including to:
    determine first pixel points with preconfigured semantics in a current image frame sampled by a camera,
    determine second pixel points with the preconfigured semantics in a previous image frame before the current image frame, the first pixel points corresponding to at least a portion of the second pixel points,
    determine an error between the first pixel points and the second pixel points, the error including a semantic error,
    determine a camera pose change value of the current image frame relative to the previous image frame based on the error, and
    determine a camera pose corresponding to the current image frame based on a camera pose corresponding to the previous image frame and the camera pose change value of the current image frame relative to the previous image frame,
    wherein the processor is further programmed to:
        determine the second pixel points corresponding at least partially to the first pixel points based on a default pose change value of the camera;
        determine the error between the first pixel points and the corresponding second pixel points and a Jacobian matrix by calculating a first-order partial derivative of the error relative to a default pose change value of the camera;
        calculate a Hessian matrix based on the Jacobian matrix;
        determine a pose change increment by decomposing the Hessian matrix;
        determine a new pose change value based on the pose change increment; and
        execute iteratively the above operations by using the new pose change value, until the new pose change value converges and the error realizes a global minimization, a convergence value of the new pose change value being the camera pose change value of the current image frame relative to the previous image frame.

12. The mobile device of claim 11 wherein the semantic error refers to a difference between a probability value that the first pixel points in the current image frame belong to the preconfigured semantics and a probability value that the corresponding second pixel points in the previous image frame belong to the preconfigured semantics.

13. The mobile device of claim 11 wherein the error further comprises a photometric error and/or a reprojection error.

14. The mobile device of claim 11 wherein if the previous image frame is an initial image frame, the pose change value of the camera is a camera pose change value determined by a sensor associated with the camera, and if the previous image frame is an image other than the initial image frame, a default pose change value of the camera is a camera pose change value associated with the previous image frame.

15. The mobile device of claim 11 wherein the processor is further programmed to determine the Hessian matrix based on a product of a transpose of the Jacobian matrix and the Jacobian matrix.

* * * * *